(12) United States Patent
Chapman

(10) Patent No.: US 10,577,078 B2
(45) Date of Patent: Mar. 3, 2020

(54) SYSTEMS AND METHODS FOR ELECTRONIC MEASUREMENT OF PROPELLER BLADE ANGLE

(71) Applicant: General Electric Company, Schenectady, NY (US)

(72) Inventor: Christopher Michael Chapman, Boston, MA (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 15/495,011

(22) Filed: Apr. 24, 2017

(65) Prior Publication Data

US 2018/0306053 A1   Oct. 25, 2018

(51) Int. Cl.
| | |
|---|---|
| *B64C 11/06* | (2006.01) |
| *G01P 3/481* | (2006.01) |
| *B64C 11/30* | (2006.01) |
| *G01D 5/20* | (2006.01) |
| *G01D 5/14* | (2006.01) |
| *G01D 5/241* | (2006.01) |

(52) U.S. Cl.
CPC ............ *B64C 11/06* (2013.01); *B64C 11/301* (2013.01); *G01P 3/481* (2013.01); *G01D 5/145* (2013.01); *G01D 5/20* (2013.01); *G01D 5/241* (2013.01)

(58) Field of Classification Search
CPC . F01D 21/003; F01D 7/00; F01D 5/12; F01D 5/02; G01P 1/00; G01D 5/241; G01D 5/20; G01D 5/145; F05D 2220/32; F05D 2220/36
See application file for complete search history.

(56) References Cited

U.S. PATENT DOCUMENTS

| | | | |
|---|---|---|---|
| 2,337,613 A | 12/1943 | Martin | |
| 3,895,883 A * | 7/1975 | Pedersen | .................. B63H 3/00 416/61 |
| 3,922,852 A * | 12/1975 | Drabek | ..................... F01D 7/00 60/226.1 |
| 3,973,873 A | 8/1976 | Shank | |
| 4,488,399 A | 12/1984 | Robey et al. | |
| 4,879,555 A * | 11/1989 | Ichikawa | ............. F15B 15/2846 341/13 |
| 4,948,337 A | 8/1990 | Martin et al. | |
| 5,364,231 A | 11/1994 | Eick et al. | |
| 5,897,293 A | 4/1999 | Arel et al. | |
| 6,213,713 B1 | 4/2001 | Dickmann | |

(Continued)

FOREIGN PATENT DOCUMENTS

| | | | |
|---|---|---|---|
| GB | 2260821 A | 4/1993 | |
| RU | 2099242 C1 * | 12/1997 | ............. B64C 11/40 |

*Primary Examiner* — Joseph J Dallo
*Assistant Examiner* — Kurt Philip Liethen
(74) *Attorney, Agent, or Firm* — Dority & Manning, P.A.

(57) ABSTRACT

Blade feedback systems and methods for determining a blade angle position and rotational speed of a plurality of propeller blades of a variable pitch propeller assembly are provided. Exemplary blade feedback system includes features for determining an axial position of a beta tube. Based at least in part on the axial position of the beta tube, the blade angle of the plurality of propeller blades can be determined. Exemplary blade feedback system can also include features for determining the rotational speed of the beta tube such that the rotational speed of the propeller blades can be determined.

20 Claims, 7 Drawing Sheets

(56) References Cited

U.S. PATENT DOCUMENTS

| | | | |
|---|---|---|---|
| 7,545,518 B2 * | 6/2009 | Heyworth | G01D 5/3473 |
| | | | 356/620 |
| 7,758,310 B2 | 7/2010 | Cotton et al. | |
| 8,946,916 B2 | 2/2015 | Tarnowski | |
| 2003/0197504 A1 * | 10/2003 | Gray | F15B 15/2861 |
| | | | 324/207.24 |
| 2004/0222788 A1 * | 11/2004 | Low | F15B 15/2846 |
| | | | 324/207.22 |
| 2010/0282068 A1 * | 11/2010 | Cani | F15B 15/2846 |
| | | | 91/1 |
| 2015/0139798 A1 | 5/2015 | Duke et al. | |
| 2016/0083077 A1 | 3/2016 | Rawdon | |
| 2016/0244149 A1 | 8/2016 | Carrington | |

* cited by examiner

SYSTEMS AND METHODS FOR ELECTRONIC MEASUREMENT OF PROPELLER BLADE ANGLE

FIELD

The present subject matter is generally related to variable pitch propeller assemblies.

BACKGROUND

Turbine engines, such as wind turbines and turboprop gas turbine engines, may include pitch adjustment mechanisms at a propeller assembly to adjust the pitch or blade angle of the propeller blades. Pitch adjustment of the propeller blades may increase turbine engine performance during various conditions (e.g., wind speed, altitude, or power output/input). Some propeller assemblies include a blade feedback system for determining the blade angle position of the propeller blades. By knowing the blade angle position of the propeller blades, turbine engine performance can be optimized.

Conventional blade feedback systems often include numerous parts, components, and/or assemblies that are generally heavy and expensive, frustrating weight reduction and performance of turbine engines. Moreover, conventional blade feedback systems are typically rigged external to the propeller hub and thus they are subject to wear and contamination from exposure to various elements (weather, dust, rocks, etc.). The rigging features can also come out of adjustment during operation, leading to unsafe flight conditions and unreliable feedback of the propeller blade angles. Additionally, the rigging features and systems are typically mounted to the propeller assembly in such a way that they must be removed whenever the propeller blades, hub, or related hardware are removed or repaired. This increases assembly and disassembly times of the propeller assembly.

Therefore, there is a need for improved blade feedback systems and/or methods that address these noted challenges.

BRIEF DESCRIPTION

Aspects and advantages of the invention will be set forth in part in the following description, or may be obvious from the description, or may be learned through practice of the invention.

In one exemplary aspect, the present subject matter is directed to a blade feedback system for an engine defining an axial direction, a radial direction, and a circumferential direction. The blade feedback system includes a propeller assembly rotatable about the axial direction and operatively coupled with the engine. The propeller assembly includes a plurality of blades spaced apart in the circumferential direction and disposed about the axial direction. The blades are configured to be rotated through a plurality of blade angles about their respective pitch axes each extending in the radial direction. The blade feedback system further includes a housing that includes a sensor, the housing attached to or integral with the engine and in adjacent arrangement with the propeller assembly along the axial direction. Moreover, the blade feedback system includes a beta tube operatively coupled with the plurality of blades and extending at least partially into the housing and at least partially into the propeller assembly, the beta tube rotatable about the axial direction as the propeller assembly rotates and translatable along the axial direction when the plurality of blades are rotated about their respective pitch axes, and wherein the beta tube defines one or more grooves extending along the axial direction and positioned proximate the sensor of the housing such that the sensor can detect the one or more grooves.

In some exemplary embodiments, the one or more grooves include a first groove and a second groove, wherein the first groove and the second groove are spaced apart from one another along the circumferential direction and wherein the first groove varies in phase along the circumferential direction as the first groove extends along the axial direction.

In some exemplary embodiments, the one or more grooves include a first groove and a second groove, wherein the first groove extends along the axial direction and along the circumferential direction to at least partially define a helix, and wherein the second groove extends in the axial direction.

In some exemplary embodiments, the helix of the first groove corresponds to a rotatable range through all of the plurality of blade angles.

In some exemplary embodiments, the second groove extends in the axial direction in a constant phase.

In some exemplary embodiments, the helix of the first groove varies in phase about one hundred ten degrees (110°) along the circumferential direction.

In some exemplary embodiments, the beta tube defines a grooved portion defined by the axial length of the first and second grooves, the grooved portion having a first end and a second end opposite the first end, wherein the first groove is phased forty-five degrees (45°) from the second groove at the second end of the grooved portion and the first groove is phased about one hundred fifty-five degrees (155°) from the second groove at the first end of the grooved portion.

In some exemplary embodiments, the one or more grooves include a first groove and a second groove. The first groove extends at least partially in the circumferential direction and along the axial direction to at least partially define a helix, and wherein the helix of the first groove varies in phase about one hundred ten degrees (110°) along the circumferential direction. The second groove extends in the axial direction in a constant phase.

In some exemplary embodiments, the one or more grooves include a first groove extending along the axial direction, the first groove having a groove width varying along the axial direction, and wherein the sensor is configured to sense the groove width such that the axial position of the beta tube can be determined.

In some exemplary embodiments, the groove width of the first groove gradually increases along the axial direction.

In some exemplary embodiments the engine further includes an engine controller communicatively coupled with the sensor, wherein the engine controller is configured to receive one or more signals from the sensor indicative of at least one of the axial position and rotational speed of the beta tube.

In some exemplary embodiments, the one or more grooves include a first groove and a second groove, and wherein the sensor is configured to sense a distance between the first and second grooves, and wherein the feedback system further includes an engine controller communicatively coupled with the sensor, wherein the engine controller is configured to receive one or more signals from the sensor indicative of the axial position of the beta tube; and wherein the one or more signals are indicative of a time between the first groove reaching radial proximity to the sensor and the second groove reaching radial proximity to the sensor as the beta tube rotates about the axial direction.

In another exemplary aspect, the present subject matter is directed to a blade feedback system for an engine defining an axial direction, a radial direction, and a circumferential direction. The blade feedback system includes a propeller assembly rotatable about the axial direction and operatively coupled with the engine, the propeller assembly includes a plurality of blades spaced apart in the circumferential direction and disposed about the axial direction, wherein the blades are configured to be rotated through a plurality of blade angles about their respective pitch axes each extending in the radial direction. The blade feedback system also includes a beta tube operatively coupled with the plurality of blades and rotatable about the axial direction as the propeller assembly rotates and translatable along the axial direction when the plurality of blades are rotated about their respective pitch axes, and wherein the beta tube defines one or more grooves extending along the axial direction. The blade feedback system additionally includes a sensor positioned proximate the one or more grooves such that the sensor can detect the one or more grooves as the beta tube is rotated about the axial direction and translated along the axial direction. Moreover, the blade angle feedback system includes an engine controller communicatively coupled with the sensor, the engine controller configured to receive one or more signals indicative of an axial position of the beta tube such that the blade angle of the plurality of blades can be determined.

In some exemplary embodiments, the sensor is at least one of a variable reluctance sensor, capacitive, a magnetic, and an inductive proximity sensor.

In some exemplary embodiments, the beta tube includes a body portion and an extension portion attached to or integral with the body portion, the extension portion coaxially aligned with the body portion along the axial direction, and wherein the extension portion has a smaller diameter than the body portion and includes the one or more grooves.

In some exemplary embodiments, the one or more grooves include a first groove and a second groove, wherein the first groove extends in a variable phase along the circumferential direction as the first groove extends along the axial direction and the second groove extends in a constant phase along the circumferential direction as the second groove extends along the axial direction, and wherein the first groove is spaced apart from the second groove along the circumferential direction.

In another exemplary aspect, the present subject matter is directed to a method for determining a blade angle of propeller blades of a propeller assembly about their respective pitch axes, the propeller assembly operatively coupled with an engine defining an axial direction, a radial direction, and a circumferential direction. The method includes: rotating a beta tube about the axial direction, the beta tube defining a first groove and a second groove, wherein the first groove extends in a variable phase along the circumferential direction as the first groove extends along the axial direction and the second groove extends in a constant phase along the circumferential direction as the second groove extends along the axial direction, the first groove spaced apart from the second groove along the circumferential direction; sensing a spatial relationship between the first groove and the second groove; and determining an axial position of the beta tube based at least in part on the spatial relationship between the first groove and the second groove.

In some exemplary implementations, the spatial relationship is a circumferential distance between the first groove and the second groove, and wherein the spatial relationship corresponds to the axial position of the beta tube.

In some exemplary implementations, the method further includes: receiving one or more signals indicative of the spatial relationship between the first groove and the second groove; and determining the blade angle of the propeller blades based at least in part on the one or more signals.

In some exemplary implementations, the engine includes a sensor, and wherein the sensor is positioned proximate the first and second grooves such that the sensor can detect the first and second grooves as the beta tube is rotated about the axial direction, and wherein during determining, the method further includes: comparing a time delay between a time when the first groove reaches a radial proximity to the sensor and a time when the second groove reaches a radial proximity to the sensor as the beta tube rotates about the axial direction such that the spatial relationship between the first and the second groove can be determined.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
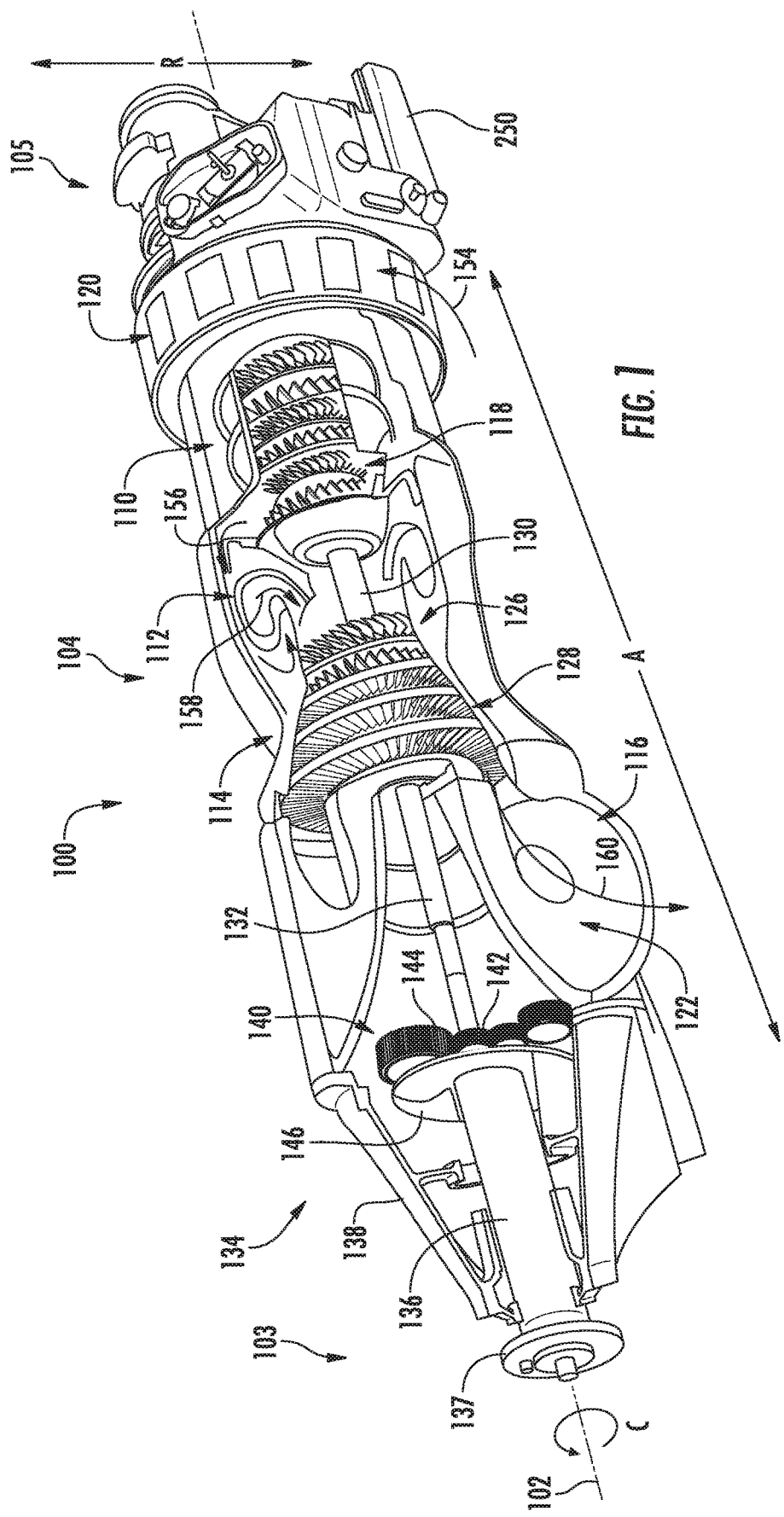
FIG. 1 is a perspective, cutaway view of a gas turbine engine according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The present disclosure is directed to blade feedback systems and methods for determining a blade angle position and rotational speed of a plurality of propeller blades of a propeller assembly. In one exemplary aspect, a blade feedback system for an engine having an adjustable pitch propeller assembly is provided. The engine defines an axial, radial, and circumferential direction. The system includes a propeller assembly that includes a plurality of pitch adjustable propeller blades. The propeller assembly and the propeller blades are rotatable about the axial direction. A beta tube is operatively coupled with the propeller blades. As the propeller assembly and its blades rotate about the axial direction, the beta tube likewise rotates about the axial direction. The propeller blades are each rotatable about their respective pitch axes by a propeller pitch actuator that is actuated by a pitch control assembly. The pitch control assembly and propeller pitch actuator operatively couple the propeller blades with the beta tube. When the propeller blades are rotated about their respective pitch axes, the beta tube translates along the axial direction. The beta tube defines one or more identifiable features (e.g., one or more grooves) along its axial length. A sensor is positioned proximate the one or more grooves such that the sensor can detect the one or more grooves as the beta tube is rotated about and translated along the axial direction. The features of the one or more grooves or the spatial relationship between two or more grooves is detected such that the axial position of the beta tube can be determined. As the axial position of the beta tube is a function of blade angle, the blade angle of the propeller blades can be determined when the axial position of the beta tube is known. An electronic engine controller can receive one or more signals from the sensor indicative of the axial position of the beta tube such that the propeller blade angle position of the propeller blades can be determined.

Among other benefits and advantages, the blade feedback system of the present disclosure may eliminate the need for external rigging of feedback systems, as the beta tube and sensors can be positioned internal to the propeller hub or engine. In this way, the blade feedback system of the present disclosure can be an engine-internal blade feedback system. Thus, the systems of the present disclosure may provide improved reliability and blade angle feedback, as well as reduced weight and cost. Moreover, during maintenance and repair, the task of unrigging and rigging the external components typically used for conventional systems is eliminated. Other advantages and benefits will become apparent in view of the following description and accompanying drawings.

Figure 2:
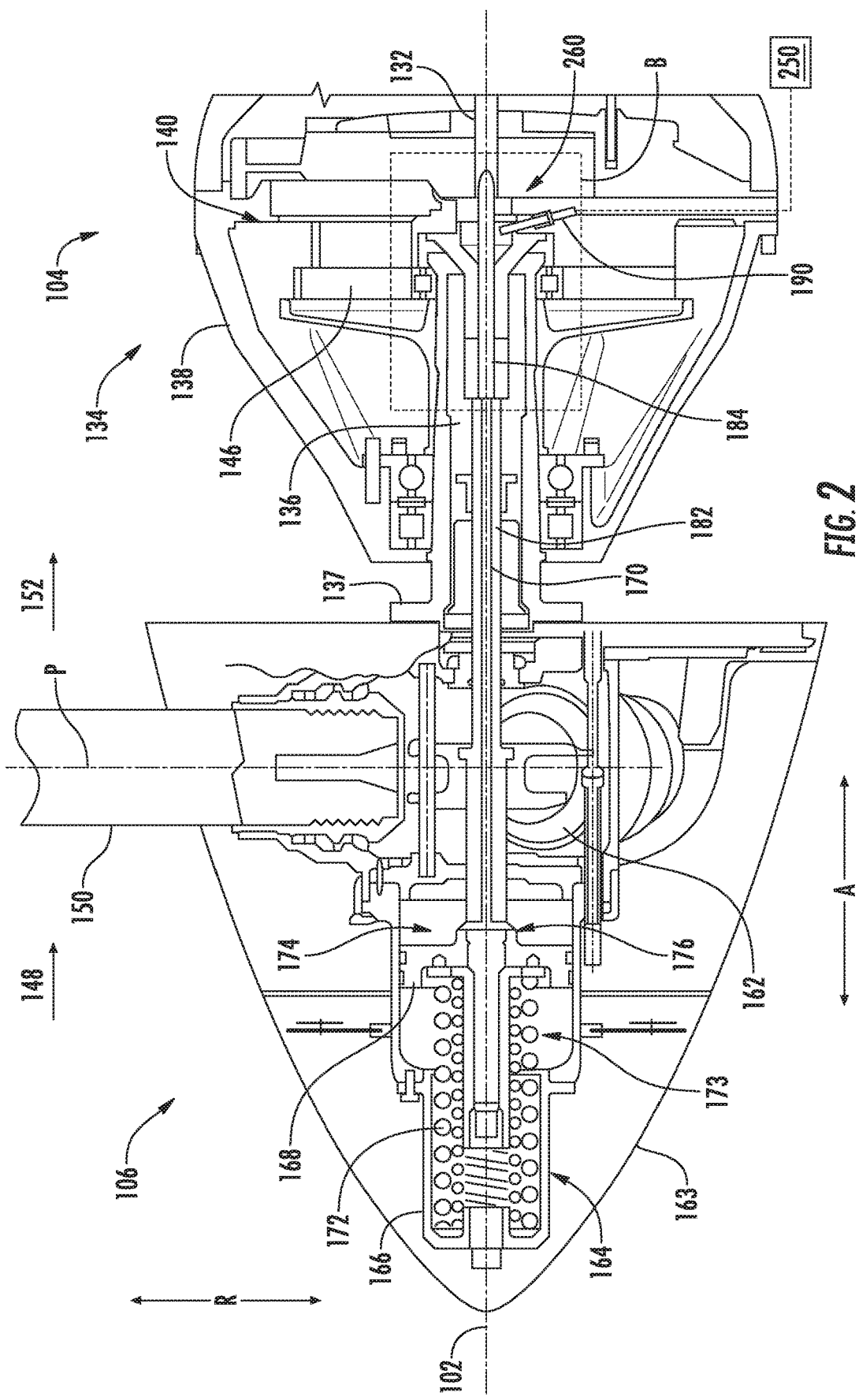
FIG. 2 is a cross sectional side view of a propeller assembly and forward end of the gas turbine engine of FIG. 1.

Turning now to the drawings with reference to FIGS. 1 and 2, FIG. 1 provides a perspective, cutaway view of an engine according to exemplary embodiments of the present disclosure and FIG. 2 is a cross sectional side view of the forward end of the engine of FIG. 1 showing an exemplary propeller assembly. For this embodiment, the engine is a gas turbine engine 100 depicted as a turboprop engine. The gas turbine engine 100 defines an axial direction A, a radial direction R, and a circumferential direction C disposed about the axial direction A. The gas turbine engine 100 extends generally along the axial direction A between a first end 103 and a second end 105. The gas turbine engine 100 generally includes a generator or core turbine engine 104 and a propeller assembly 106 (FIG. 2) rotatable about the axial direction A. The gas turbine engine 100 defines an axial centerline 102 extending through the core turbine engine 104 and the propeller assembly 106 (FIG. 2) along the axial direction A.

As shown in FIG. 1, the core turbine engine 104 generally includes, in serial flow arrangement, a compressor section 110, a combustion section 112, a turbine section 114, and an exhaust section 116. A core air flowpath 118 extends from an annular inlet 120 to one or more exhaust outlets 122 of the exhaust section 116 such that the compressor section 110, combustion section 112, turbine section 114, and exhaust section 116 are in fluid communication.

The compressor section 110 may include one or more compressors, such as a high pressure compressor (HPC) and a low pressure compressor (LPC). For this embodiment, the compressor section 110 includes a four-stage axial, single centrifugal compressor. In particular, the compressor includes sequential stages of compressor stator vanes and rotor blades (not labeled), as well as an impeller (not labeled) positioned downstream of the axial stages of stator vanes and rotor blades. The combustion section 112 includes a reverse-flow combustor (not labeled) and one or more fuel nozzles (not shown). The turbine section 114 may define one or more turbines, such as a high pressure turbine (HPT) and a low pressure turbine (LPT). For this embodiment, the turbine section 114 includes a two-stage HPT 126 for driving the compressor of the compressor section 110. The HPT 126 includes two sequential stages of stator vanes and turbine blades (not labeled). The turbine section 114 also includes a three-stage power turbine 128 that drives a propeller gearbox 134, which in turn drives the propeller assembly 106 (FIG. 2). The exhaust section 116 includes one or more exhaust outlets 122 for routing the combustion products to the ambient air.

The core turbine engine 104 may include one or more shafts. For this embodiment, the gas turbine engine 100 includes a compressor shaft 130 and a free or power shaft 132. The compressor shaft 130 drivingly couples the compressor section 110 to the turbine section 114 to drive the rotational components of the compressor. The power shaft 132 drivingly couples the power turbine 128 to drive a gear train 140 of the propeller gearbox 134, which in turn operatively supplies power and torque to the propeller assembly 106 via a torque output or propeller shaft 136 at a reduced RPM. The forward end of the propeller shaft 136 includes a flange 137 that provides a mounting interface for the propeller assembly 106 to be attached to the core turbine engine 104.

The propeller gearbox 134 is enclosed within a gearbox housing 138. For this embodiment, the housing 138 encloses the epicyclical gear train 140 that includes a star gear 142 and a plurality of planet gears 144 disposed about the star gear 142. The planetary gears 144 are configured to revolve around the star gear 142. An annular gear 146 is positioned axially forward of the star and planetary gears 142, 144. As the planetary gears 144 rotate about the star gear 142, torque and power are transmitted to the annular gear 146. As shown, the annular gear 146 is operatively coupled to or otherwise integral with the propeller shaft 136. In some embodiments, the gear train 140 may further include additional planetary gears disposed radially between the plurality of planet gears 144 and the star gear 142 or between the plurality of planet gears 144 and the annular gear 146. In addition, the gear train 140 may further include additional annular gears.

As noted above, the core turbine engine 104 transmits power and torque to the propeller gearbox 134 via the power shaft 132. The power shaft 132 drives the star gear 142 which in turn drives the planetary gears 144 about the star gear 142. The planetary gears 144 in turn drive the annular gear 146, which is operatively coupled with the propeller shaft 136. In this way, the energy extracted from the power turbine 128 supports operation of the propeller shaft 136, and through the power gear train 140, the relatively high RPM of the power shaft 132 is reduced to a more suitable RPM for the propeller assembly 106.

In addition, the gas turbine engine 100 includes one or more engine controllers 250 that control the engine, such as e.g., an Electronic Engine Controller (EEC) or Engine Control Unit (ECU). For this embodiment, the engine controller 250 is equipped with Full Authority Digital Engine Control (FADEC) for providing full digital control of the gas turbine engine 100. In some embodiments, the engine controllers 250 are not equipped with FADEC capability. The engine controller 250 can control aspects of the core turbine engine 104 and the propeller assembly 106. For example, the engine controller 250 can receive one or more signals from sensory devices and can determine the blade angle of a plurality of propeller blades 150 about their respective pitch axes P (FIG. 2), as well as their rotational speed about the axial direction A based at least in part on the received signals, as will be described in greater detail herein.

During operation of the gas turbine engine 100, as shown and described with regard to FIGS. 1 and 2, a volume of air indicated by arrow 148 passes across the plurality of propeller blades 150 (FIG. 2) circumferentially spaced apart in the circumferential direction C and disposed about the axial centerline 102 (only one blade is shown in FIG. 2) or more generally the axial direction A. A first portion of air indicated by arrow 152 is directed or routed outside of the core turbine engine 104 to provide propulsion. A second portion of air indicated by arrow 154 is directed or routed through the annular inlet 120 and into the compressor section 110 of the gas turbine engine 100 (FIG. 1). The second portion of air 154 is progressively compressed as it flows through the compressor section 110 and downstream toward the combustion section 112.

The compressed air indicated by arrow 156 flows into the combustion section 112 where fuel is introduced, mixed with at least a portion of the compressed air 156, and ignited to form combustion gases 158. The combustion gases 158 flow into the turbine section 114, causing rotary members of the turbine section 114 to rotate and support operation of respectively coupled rotary members in the compressor section 110 and/or propeller assembly 106. In particular, the HPT 126 extracts energy from the combustion gases 158 thereby causing the turbine blades to rotate. The rotation of the turbine blades of the HPT 126 causes the compressor shaft 130 to rotate, and as a result, the rotary components of the compressor are rotated about the axial centerline 102. In a similar fashion, the power turbine 128 extracts energy from the combustion gases 158 thereby causing the blades of the power turbine 128 to rotate about the axial centerline 102. The rotation of the turbine blades of the power turbine 128 causes the power shaft 132 to rotate, which in turn drives the power gear train 140 of the propeller gearbox 134. The propeller gearbox 134 in turn transmits the power and torque provided by the power shaft 132 to the propeller shaft 136 at a reduced RPM and desired amount of torque. The propeller shaft 136 in turn drives the propeller assembly 106 such that the propeller blades 150 rotate about the axial direction A, and more particularly in this embodiment, the axial centerline 102 of the gas turbine engine 100. The exhaust gases, denoted by 160, exit the core turbine engine 104 through the exhaust outlets 122 to the ambient air.

It should be appreciated that the exemplary gas turbine engine 100 described herein is provided by way of example only. For example, in other exemplary embodiments, the turbine engine may include any suitable number or types of compressors (such as e.g., reverse flow and/or axial compressors), turbines, shafts, stages, etc. Additionally, in some exemplary embodiments, the gas turbine engine may include any suitable type of combustor, and may not include the exemplary reverse-flow combustor depicted. In addition, it will be appreciated that the present subject matter can be applied to or employed with any suitable type of propeller configuration, including, for example, tractor and pusher configurations. Furthermore, although the gas turbine engine described above is an aeronautical gas turbine engine for propulsion of a fixed-wing or rotor aircraft, the gas turbine engine may be configured as any suitable type of gas turbine engine for use in any number of applications, such as wind turbine or marine applications. Moreover, in yet other embodiments, the engine can be configured as a reciprocating or piston engine. In yet other embodiments, the gas turbine engine may include an electrical generator such as defined in wind or hydro turbines. The propeller assembly 106 may rotate due to passing of a fluid, such as air or water, across the plurality of blades 150 of the propeller assembly 106.

The propeller assembly 106 will now be described in more detail with reference to FIG. 2. As noted above, the first end 103 of the core turbine engine 104 includes the power shaft 132 that operatively drives the power gear train 140. The annular gear 146 of the power gear train 140 is shown operatively coupled with the propeller shaft 136 for rotating it about the axial direction A. The flange 137 of the propeller shaft 136 operatively couples the core turbine engine 104 with the propeller assembly 106. The propeller shaft 136 drives a hub 162 into which the plurality of propeller blades 150 are placed and extend outwardly from in the radial direction R. As the propeller shaft 136 rotates about the axial direction A, the hub 162 in turn rotates the propeller blades 150 about the axial direction A. For this embodiment, the propeller blades 150 are rotated about the axial centerline 102. A spinner 163 aerodynamically contoured to promote an airflow through the plurality of propeller blades 150 encloses the hub 162 and other propeller components. The spinner 163 is rotatable with the propeller blades 150 about the axial direction A.

As shown, propeller assembly 106 is a variable pitch or full feathering propeller assembly. That is, each propeller blade 150 is rotatable about a pitch axis P extended in the radial direction R from the axial centerline 102 (each pitch axis P is relative to a corresponding propeller blade 150). To control and/or actuate the propeller blades 150 about their respective pitch axes P, the propeller assembly 106 includes a pitch control assembly 164.

The pitch control assembly 164 includes a dome or housing 166 that defines one or more chambers and encloses a control piston 168 that is translatable along the axial direction A. The control piston 168 is biased on one side by a spring 172 positioned within a first chamber 173 and on the opposite side by a second chamber 174. The first and second chambers 173, 174 are defined by the housing 166. Depending on the desired pitch of the propeller blades 150, the first and second chambers 173, 174 may be filled with varying quantities of hydraulic fluid, such as oil.

The control piston 168 is operatively coupled with a beta tube 170 that extends along the axial direction A, and when the propeller blades 150 are rotated about the axial direction A (and more generally the propeller assembly 106), the beta tube 170 is likewise rotatable about the axial direction A. As shown in FIG. 2, the beta tube 170 extends at least partially into the propeller assembly 106 and at least partially into the housing 138 of the first end 103 of the core turbine engine 104. In some embodiments, the beta tube 170 may be at least partially enclosed by a piston rod along at least a portion of the axial length of the beta tube 170. The piston rod may couple the beta tube 170 with the control piston 168.

As will be appreciated, to control the blade angles of the propeller blades 150, hydraulic fluid may be fed through the beta tube 170 and/or other fluid channels to the first or second chamber 173, 174 positioned axially adjacent the control piston 168 to translate the control piston 168 along the axial direction A. In some embodiments, the beta tube 170 can define one or more orifices 176 that permit hydraulic fluid to flow from the hollow beta tube 170 to one of the chambers 173, 174 depending on the desired blade pitch.

When hydraulic fluid is supplied to the second chamber 174 (from an oil governor positioned in the core turbine engine 104, for example), the additional hydraulic fluid applies pressure to the control piston 168 tending to translate the control piston 168 in a forward direction along the axial direction A, or in a leftward direction as shown in FIG. 2. This in turn causes the beta tube 170 to translate forward as well (or toward the left in FIG. 2). Conversely, when hydraulic fluid is reduced or removed from the second chamber 174 and/or hydraulic fluid is supplied to the first chamber 173, less of a forward force is applied to the control piston 168, and as a result, the spring 172 and additional hydraulic fluid in the first chamber 173 bias the control piston 168 in an aft direction, or in a rightward direction in FIG. 2. This in turn causes the beta tube 170 to translate in an aft direction as well. In this way, the beta tube 170 is translatable along the axial direction A. As will be described in greater detail herein, the axial position of the beta tube 170 corresponds with a particular blade angle or angular position of the propeller blades 150.

To move the propeller blades 150 about their respective pitch axes P, the propeller assembly 106 includes a pitch actuation or propeller pitch actuator 178 to pitch or actuate the propeller blades 150. When the control piston 168 of the pitch control assembly 164 is translated along the axial direction A, the propeller pitch actuator 178, which is operatively coupled to one or more components of the control pitch assembly 164 or the beta tube 170, rotates the propeller blades 150 about their respective pitch axes P.

Figure 3:
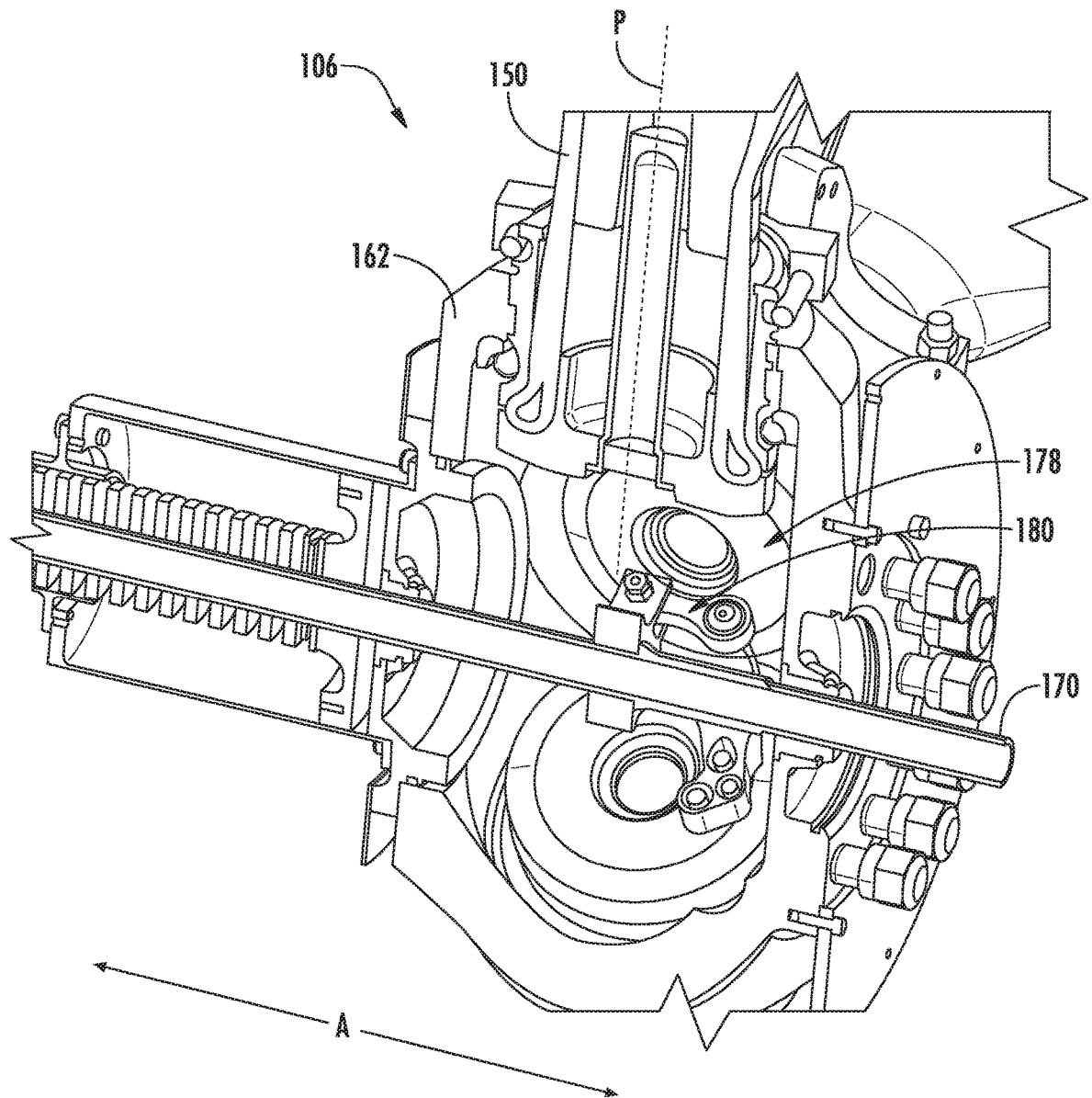
FIG. 3 is a close up, cutaway perspective view of an exemplary beta tube and propeller pitch actuator according to exemplary embodiments of the present disclosure.

FIG. 3 provides a close up, cutaway perspective view of the beta tube 170 and the propeller pitch actuator 178 according to exemplary embodiments of the present disclosure. As shown, the beta tube 170 is operatively coupled with the propeller pitch actuator 178, which in this embodiment includes an actuation lever 180. The actuation lever 180 is operatively coupled to the plurality of blades 150 such that movement of the actuation lever 180 along the axial direction A translates into rotational movement of the plurality of blades 150 about their respective pitch axes P. Stated alternatively, as the beta tube 170 translates along the axial direction A (caused by the axial displacement of the control piston 168), the actuation lever 180 also translates along the axial direction A. This in turn causes rotational movement of the plurality of blades 150 about their respective pitch axes P, thereby adjusting the blade angles of the propeller blades 150 to the desired pitch. Thus, by controlling the quantity of hydraulic fluid within the first and second chambers 173, 174 adjacent the control piston 168, the propeller blades 150 can be controlled through a plurality of blade angles about their respective pitch axes P by the actuation lever 180.

In other various embodiments, the beta tube 170 may be enclosed by a piston rod, as noted above. In such an embodiment, the actuation lever 180 can be operatively coupled with the piston rod instead of the beta tube 170. In yet other embodiments, it will be appreciated that the propeller pitch actuator 178 may include additional or alternative structures that provide feathering or pitch actuation functionality. For example, such structure may include actuation linkages linking the control piston 168, piston rod, or other axially displaceable components with the propeller blades 150. Other structures may include a yoke and cam assembly operatively coupled with the beta tube 170 and/or piston rod enclosing the beta tube 170. Any suitable structure known in the art can be used to feather the propeller blades 150 about their respective pitch axes P. Stated alternatively, any known assemblies or structures for converting the translatory motion of the beta tube 170 into rotational motion of the propeller blades 150 is contemplated.

Returning to FIG. 2, a blade feedback system 260 is shown. In particular, for some embodiments, the blade feedback system 260 includes the propeller assembly 106 operatively coupled with the core turbine engine 104, the variable pitch propeller blades 150 of the propeller assembly 106, the beta tube 170 operatively coupled with the plurality of blades 150, a sensor 190 positioned proximate the beta tube 170, and the engine controller 250 communicatively coupled with the sensor 190 (i.e., by one or more wireless or wired communication lines). As will be described in greater detail herein, as the propeller blades 150 rotate about the axial direction A, the beta tube 170, which is operatively coupled with the blades 150, rotates about the axial direction A as well. The sensor 190 can detect the rotational speed of the beta tube 170 and send one or more signals to the engine controller 250 indicating the rotational speed. As the beta tube 170 rotates in unison or substantially in unison with the propeller assembly 106 and blades 150, the rotational speed of the propeller blades 150 is known and the engine controller 250 can control the core turbine engine 104 and propeller assembly 106 accordingly. Moreover, the sensor 190 can detect one or more features (e.g., grooves) defined in or on the beta tube 170 as the beta tube 170 rotates about the axial direction A. As the features of the one or more grooves or the spatial relationship between the grooves corresponds with an axial position of the beta tube 170 along the axial direction A, and the axial position corresponds with a particular blade or pitch angle of the propeller blades 150, the propeller blade angle can be determined when the axial position of the beta tube 170 is known. The detection of the one or more grooves of the beta tube 170 will now be described in more detail.

Figure 4:
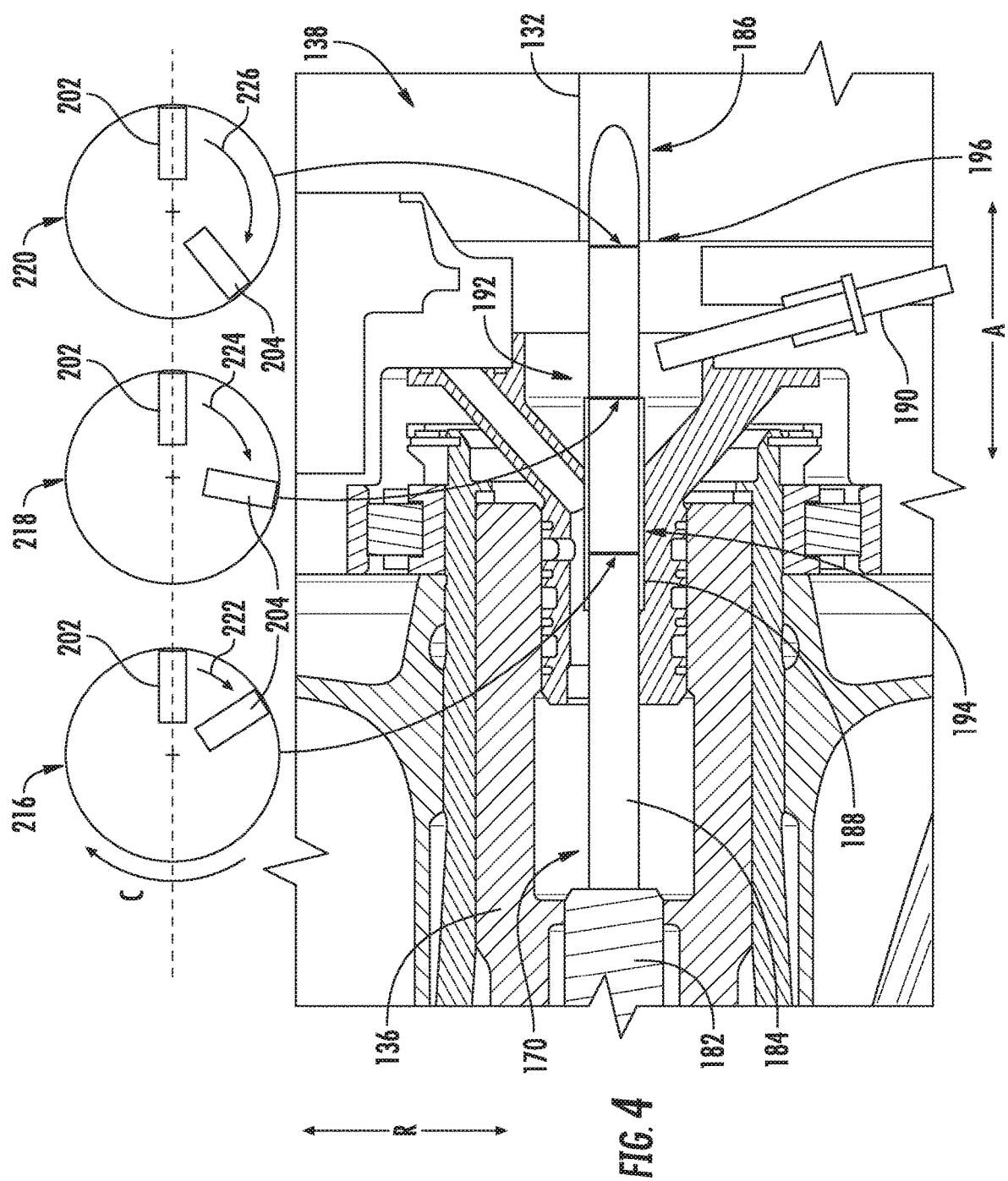
FIG. 4 is a close up, cross sectional view of Section B of FIG. 2 illustrating exemplary beta tube according to exemplary embodiments of the present disclosure.

FIG. 4 provides a close up, cross sectional view of Section B of FIG. 2 illustrating exemplary beta tube 170 according to exemplary embodiments of the present disclosure. More particularly, an aft portion of the beta tube 170 extending at least partially into the gearbox housing 138 is shown. The beta tube 170 includes a body portion 182 and an extension portion 184. The extension portion 184 can be attached to or formed integrally with the body portion 182 and is coaxially aligned with the body portion 182 along the axial direction A. The extension portion 184 is generally cylindrical and includes a doghead structure 186 at its aft most end to prevent damage to the extension portion 184 during assembly. The doghead structure 186 also provides a more aerodynamic contour to the extension portion 184 of the beta tube 170. The extension portion 184 can be supported by a bearing or journal 188. The journal 188 is sized to be complementary to the outer diameter of the extension portion 184 such that the extension portion 184 may freely rotate about the axial direction A during operation of the gas turbine engine 100.

For this embodiment, the extension portion 184 has a smaller diameter than the body portion 182. This may reduce the weight of the extension portion 184 and allow for the extension portion 184 to extend a distance along the axial direction A without interfering with existing components of the propeller gearbox 134. As shown, the extension portion 184 extends the beta tube 170 within the non-rotating housing 138 and further aft than the propeller shaft 136. In this way, the beta tube 170 has a portion along its axial length that can be more easily sensed by sensing devices secured and positioned with or on the non-rotating housing 138 or another non-rotating component. By way of example, as shown in FIG. 4, the sensor 190 secured by or with a non-rotating component of the housing 138 is positioned proximate the beta tube 170 such that it may easily detect the rotational speed and/or axial position of the beta tube 170 as will be described herein. The sensor 190 can be at least one of a variable reluctance sensor, a capacitive sensor, a magnetic sensor, and an inductive proximity sensor, a combination of the foregoing, or any other suitable sensor capable of detecting one or more features positioned on or integral with the beta tube 170. For this embodiment, the sensor 190 is shown as a variable reluctance sensor.

Figure 5:
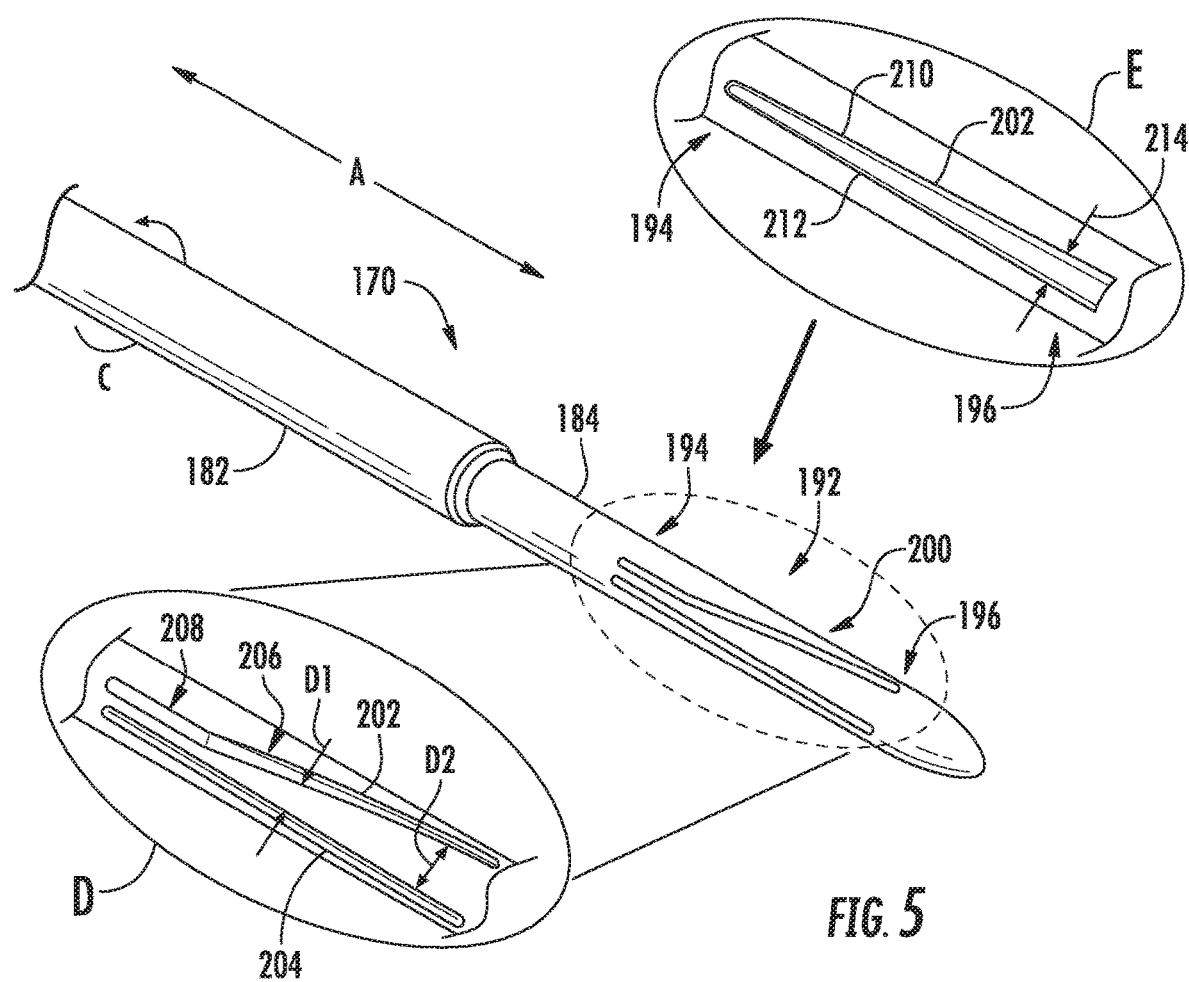
FIG. 5 is a close up, perspective view of an aft end of an exemplary beta tube according to exemplary embodiments of the present disclosure.

FIG. 5 provides a close up, perspective view of the aft end of exemplary beta tube 170 according to exemplary embodiments of the present disclosure. The beta tube 170 is shown without the propeller assembly 106 and the gearbox housing 138 of the core turbine engine 104 for illustrative purposes. As shown, the beta tube 170 includes a grooved portion 192 in which one or more tabs or grooves are defined by the beta tube 170. For this embodiment, the grooved portion 192 is positioned on the extension portion 184 of the beta tube 170. In some embodiments, the grooved portion 182 can be positioned on the body portion 182 of the beta tube 170. The grooved portion 192 has a first end 194 and a second end 196 opposite the first end 194, which in this embodiment is a forward and aft end of the grooved portion 192, respectively. The grooved portion 192 is defined by the axial length of one or more grooves 200 of the beta tube 170. Stated alternatively, the grooved portion 192 extends the length of the grooves 200.

In some exemplary embodiments, the beta tube 170 defines a first groove 202 and a second groove 204 as detailed in Section D of FIG. 5. The first groove 202 extends along the axial direction A and varies in phase along the circumferential direction C at least partially along the axial length of the first groove 202. In this way, the first groove 202 is a variable phase groove. In particular, the first groove 202 extends along the circumferential direction C to at least partially define a helical portion or helix 206. Moreover, the first groove 202 may further define a substantially straight portion 208 along the axial direction A leading into the helical portion or helix 206.

The beta tube 170 further defines a second groove 204 extending along the axial direction A approximately the same axial distance as the first groove 202. The second groove 204 defines a substantially straight portion along the axial direction A. In this manner, the second groove 204 is a constant phase groove, which may provide a reference frame or position with respect to the first groove 202, for example. As shown, the second groove 204 is spaced apart from the first groove 202 along the circumferential direction C.

For this embodiment, the distance between the first groove 202 and the second groove 204 varies along the axial length of the beta tube 170. This is due in part to the variable phasing of the first groove 202 along the circumferential direction C as the first groove 202 extends along the axial direction A, and more particularly, the variable phasing is due to the helix 206. For instance, a distance d1 denotes a distance between the first groove 202 and the second groove 204 at a first point along the grooved portion 192 of the beta tube 170. The distance d1 corresponds with a first axial position of the beta tube 170, and consequently, a first blade angle of the propeller blades 150. As further shown, a distance d2 denotes a distance between the first groove 202 and the second groove 204 at a second point along the grooved portion 192 of the beta tube 170. The distance d2 corresponds with a second axial position of the beta tube 170, and thus, a second blade angle of the propeller blades 150. As the distance between the first groove 202 and the second groove 204 varies along the axial length of the grooved portion 192, it will be appreciated that each point along the axial length of the grooved portion 192 corresponds with a particular axial position of the beta tube 170, and consequently, a particular blade angle.

When assembled, the grooved portion 192 of the beta tube 170 is positioned proximate the sensor 190 (FIG. 4). This facilitates detection of the grooves 202, 204 as the beta tube 170 is rotated about the axial direction A at the rotational speed of the propeller assembly 106. In some embodiments, the engine controller 250 (or other processing unit) can receive signals (e.g., pulse trains) from the sensor 190 indicative of a time in which the first groove 202 reaches radial proximity to the sensor 190 and a time in which the second groove 204 reaches radial proximity to the sensor 190. Stated alternatively, the one or more signals are created when the one or more grooves 200 pass by the sensor 190. Based on these one or more signals or pulse trains, and knowing the rotational speed of the beta tube 170, the distance between the grooves 200 can be determined. Specifically, the engine controller 250 can compare the time delay between a variable phase pulse of the first groove 202 and a constant phase pulse of the second groove 204 to determine the axial position of the beta tube 170, which then can be used to determine the blade angle of the propeller blades 150 (e.g., via a lookup table). It will be appreciated that other suitable methods can be used to determine the time delay or distance between the grooves 200.

In some exemplary embodiments, the beta tube 170 includes only one groove as shown in Section E. Section E represents one possible example where the grooved portion includes only one groove. In FIG. 5, the sole groove is labeled as first groove 202. For this embodiment, the first groove 202 extends along the axial direction A. The first groove 202 has a first edge 210 and a second edge 212 that define a groove width 214. As shown, the groove width 214 varies along the axial direction A. In particular, the groove width 214 of the first groove 202 gradually increases along the axial direction A from the first end 194 to the second end 196 of the grooved portion 192 of the beta tube 170. In some embodiments, the groove width 214 of the first groove 202 may gradually increase along the axial direction A from the second end 196 to the first end 194 of the grooved portion 192 of the beta tube 170.

For the single groove embodiment, the grooved portion 192 is positioned proximate the sensor 190 such that the sensor 190 can detect the features of the first groove 202, such as the groove width 214 or the first edge 210 and the second edge 212. In this way, as the beta tube 170 rotates about the axial direction A in unison with the plurality of blades 150 and propeller assembly 106, the sensor 190 can detect the first edge 210 and the second edge 212 of the first groove 202 and send one or more signals or pulse trains to the engine controller 250 indicative of the axial position of the beta tube 170. The distance between the first edge 210 and the second edge 212 (i.e., the groove width 214) corresponds with a particular axial position of the beta tube 170, and consequently, a particular angular position or blade angle of the propeller blades 150 can be determined when the axial position of the beta tube 170 is known.

In particular, in some embodiments, the engine controller 250 (or other processing unit) can receive signals (e.g., pulse trains) from the sensor 190 indicative of a time in which the first edge 210 reaches radial proximity to the sensor 190 and a time in which the second edge 212 reaches radial proximity to the sensor 190. Stated alternatively, the one or more signals are created when the edges 210, 212 pass by the sensor 190. Based at least in part on these one or more signals or pulse trains, and knowing the rotational speed of the beta tube 170, the distance between the edges 210, 212 can be determined. Specifically, the engine controller 250 can compare the time delay between a first edge pulse of the first edge 210 and a second edge pulse of the second edge 212 to determine the axial position of the beta tube 170, which then can be used to determine the blade angle of the propeller blades 150. It will be appreciated that other suitable methods can be used to determine the time delay or distance between the edges 210, 212 of the first groove 202.

As used herein, "grooves" defines a feature or indicator that may be detected by the sensor 190 when the feature or indicator reaches radial proximity to the sensor 190. The term "groove" or "first groove" or "second groove" or the like is not limited to actual grooves in the beta tube 170. In some embodiments, for example, the first groove 202 and/or the second groove 204 may define an area or strip of a first material defined in contrast to the surrounding portions of the beta tube 170 such that the sensor 190 can detect the first and second grooves 202, 204 (or edges 210, 212) when in rotation about the axial centerline 102 or more generally the axial direction A. In other various embodiments, the first and/or second grooves 202, 204 may define walls, rails, teeth, or other raised structures for differentiating a signal (e.g. a capacitive, inductive, magnetic, or electromagnetic signal) at the first and second grooves 202, 204 (or edges 210, 212) in contrast to the surrounding portions of the beta tube 170. In some embodiments, the first and/or second grooves 202, 204 (or edges 210, 212) may define a first material and a raised structure, and the surrounding portions of the beta tube 170 may define a second material, in which the first material defines a magnetic flux or a magnetic flux density toward the sensor 190 greater than second material. Other possible variations or combinations are contemplated.

Referring again to FIG. 4, the phasing of the first and second grooves 202, 204 of the exemplary beta tube 170 shown in Section D of FIG. 5 will be described in more detail. Specifically, the phasing of the grooves 200 of the beta tube 170 are shown in various cross-sectional views at 216, 218, and 220 of FIG. 4.

The first cross section 216 of the grooved portion 192 of the beta tube 170 is taken at the first end 194 of the grooved portion 192 (i.e., the forward end). As shown, the second groove 204 is positioned at zero degrees (0°) and the first groove 202 is phased about forty-five degrees (45°) from the second groove 204 at the first end 194 of the grooved portion 192.

The second cross section 218 of the grooved portion 192 of the beta tube 170 is taken about midway between the first end 194 and the second end 196 of the grooved portion 192. As shown, the second groove 204 is positioned at zero degrees (0°), as it is a constant phase groove. The first groove 202 is phased about one hundred degrees (100°) from the second groove 204. For this embodiment, the first groove 202 varies in phase defining helix 206 (FIG. 5).

The third cross section 220 of the grooved portion 192 of the beta tube 170 is taken at the second end 196 of the grooved portion 192 (i.e., the aft end). As shown, the second groove 204 is positioned at zero degrees (0°), as it is a constant phase groove. The first groove 202 is phased about one hundred fifty-five degrees) (155°) from the second groove 204 at the second end 196 of the grooved portion 192.

Thus, for this embodiment, the helix 206 of the first groove 202 varies in phase about one hundred ten degrees (110°) along the circumferential direction C as the first groove 202 extends along the axial direction A. Moreover, in this embodiment, the first groove 202 is phased forty-five degrees (45°) from the second groove 204 at the first end 194 of the grooved portion 192 and the first groove 202 is phased about one hundred fifty-five degrees (155°) from the second groove 204 at the second end 196 of the grooved portion 192. In yet other embodiments, the phasing of the first groove 202 relative to the second groove 204 can be phased in the opposite direction. Specifically, the first groove 202 can be phased forty-five degrees (45°) from the second groove 204 at the second end 196 of the grooved portion 192 and the first groove 202 can be phased about one hundred fifty-five degrees (155°) from the second groove 204 at the first end 194 of the grooved portion 192.

In yet other embodiments, the helix 206 of the first groove 202 varies in phase about seventy degrees (70°), about eighty degrees (80°), about ninety degrees) (90°), about one hundred degrees (100°), about one hundred twenty degrees (120°), about one hundred thirty degrees (130°), about one hundred forty degrees (140°), about one hundred fifty degrees (150°), about one hundred sixty degrees (160°), about one hundred seventy degrees (170°), or about one hundred eighty degrees (180°) along the circumferential direction C as the first groove 202 extends along the axial direction A. Other possible variable phases are contemplated. The specific examples above are exemplary only.

As shown, the spatial relationship or distance along the circumferential direction C between the first groove 202 relative to the second groove 204 varies or changes along the axial direction A (or the first edge 210 relative to the second edge 212). For example, when the beta tube 170 translates along the axial direction A such that the grooves 202, 204 at first cross section 216 are proximate to the sensor 190, the distance between the first groove 202 and the second groove 204 defines a first distance along the circumferential direction C corresponding to a first pitch angle 222 of the plurality of blades 150. When the beta tube 170 translates such that the grooves 202, 204 at the second cross section 218 are proximate to the sensor 190, the distance between the first groove 202 and the second groove 204 defines a second distance along the circumferential direction C corresponding to a second pitch angle 224 of the plurality of blades 150. When the beta tube 170 translates such that the grooves 202, 204 at the third section view 220 are proximate to the sensor 190, the distance between the first groove 202 and the second groove 204 defines a third distance along the circumferential direction C corresponding to a third pitch angle 226 of the plurality of blades 150.

In still other embodiments, the sensor 190 may further define a speed sensor for the propeller assembly 106 in addition to a sensor configured to detect the one or more grooves 200 of the beta tube 170. The speed signal received from at least one of the grooves 202, 204 may be used to define a rotational speed of the beta tube 170, and as the beta tube 170 rotates at the same or substantially the same rotational speed as propeller assembly 106 and its plurality of blades 150, the rotational speed of the propeller blades 150 can be determined by sensing the rotational speed of the beta tube 170.

Figure 6:
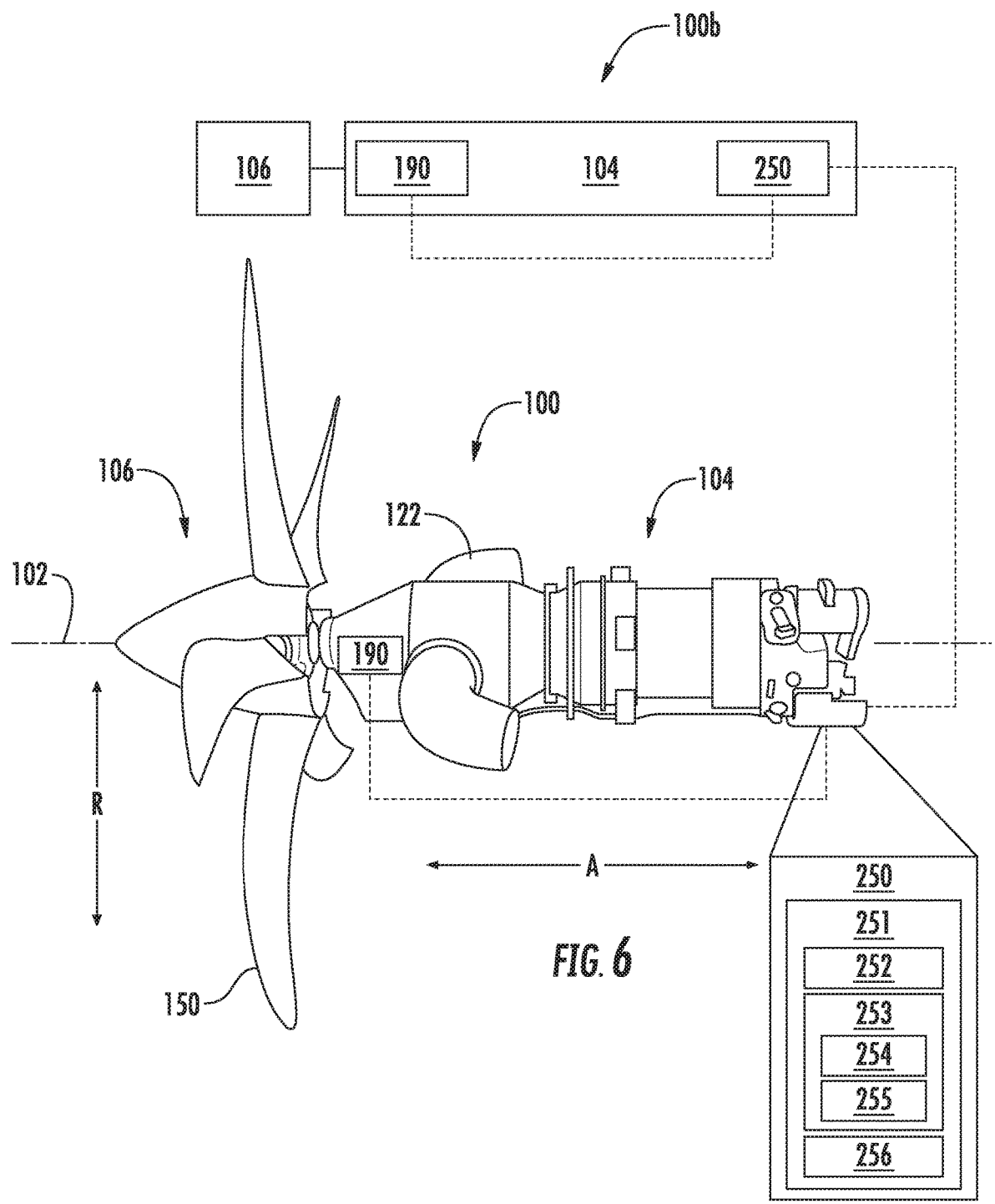
FIG. 6 is a schematic view of an exemplary gas turbine engine communicatively coupled with a second gas turbine engine.

FIG. 6 provides a schematic view of exemplary gas turbine engine 100 communicatively coupled with a second gas turbine engine 100b. As shown, the gas turbine engine 100 and the second gas turbine engine 100b both include engine controllers 250. In some embodiments, the engine controllers 250 are equipped with FADEC capability. Each engine controller 250 includes various components for performing various operations and functions, such as e.g., receiving one or more signals from their respective sensors 190 and determining an angular position of the propeller blades 150 based at least in part on the determined axial position of the beta tube 170.

Engine controllers 250 can include one or more computing device(s) 251. The computing device(s) 251 can include one or more processor(s) 252 and one or more memory device(s) 253. The one or more processor(s) 252 can include any suitable processing device, such as a microprocessor, microcontroller, integrated circuit, logic device, and/or other suitable processing device. The one or more memory device (s) 253 can include one or more computer-readable media, including, but not limited to, non-transitory computer-readable media, RAM, ROM, hard drives, flash drives, and/or other memory devices.

The one or more memory device(s) 253 can store information accessible by the one or more processor(s) 252, including computer-readable instructions 254 that can be executed by the one or more processor(s) 252. The instructions 254 can be any set of instructions that when executed by the one or more processor(s) 252, cause the one or more processor(s) 252 to perform operations. In some embodiments, the instructions 254 can be executed by the one or more processor(s) 252 to cause the one or more processor(s) 252 to perform operations, such as any of the operations and functions for which the engine controller 250 and/or the computing device(s) 251 are configured, such as e.g., receiving one or more signals from sensors 190 and determining an axial position of the beta tube 170 such that the blade angle of the propeller blades 150 can be determined. The instructions 254 can be software written in any suitable programming language or can be implemented in hardware. Additionally, and/or alternatively, the instructions 254 can be executed in logically and/or virtually separate threads on processor(s) 252.

The memory device(s) 253 can further store data 255 that can be accessed by the one or more processor(s) 252. For example, the data 255 can include look up tables that correspond a particular circumferential distance or time delay with a particular pitch angle of the propeller blades 150. The data 255 can also include other data sets, parameters, outputs, information, etc. shown and/or described herein.

The computing device(s) 251 can also include a communication interface 256 used to communicate, for example, with other components of an aircraft in which the gas turbine engine 100 and/or second gas turbine engine 100b are mounted to as well as between the two controllers 250 of the gas turbine engine 100 and the second gas turbine engine 100b. The communication interface 256 can include any suitable components for interfacing with one or more network(s), including for example, transmitters, receivers, ports, controllers, antennas, and/or other suitable components.

As shown in FIG. 6, the engine controller 250 of the gas turbine engine 100 is communicatively coupled with the sensor 190 is configured to receive one or more signals indicative of the axial position of the beta tube 170 from the sensor 190 positioned within the non-rotating gearbox housing 138. Likewise, the engine controller 250 of the second gas turbine engine 100b is communicatively coupled with its sensor 190 and is configured to receive one or more signals indicative of the axial position of the beta tube 170 from the sensor 190 positioned within the non-rotating gearbox housing 138 of the second gas turbine engine 100b.

In some embodiments, the engine controllers 250 of the gas turbine engines 100, 100b can be communicatively coupled with one another such that engine controllers 250 can synchronize and synchrophase the propeller speeds and propeller blade angles of the two engines 100, 100b. Specifically one or both of the engine controllers 250 can include synchronization logic that can be used to operatively control the rotational speed of the propellers 150 such that propeller blades 150 of the gas turbine engine 100 and the second gas turbine engine 100b rotate at the same or substantially similar speed. In this way, the "beats" or undesirable vibrations/noise of the propeller blades 150 can be reduced or eliminated. Moreover, one or both of the engine controllers 250 can include synchrophase logic that can operatively synchronize the propeller pitch angles of the propellers 150 of each engine 100, 100b. In this manner, vibration and noise reduction can further be achieved, as well as improved engine performance.

Figure 7:
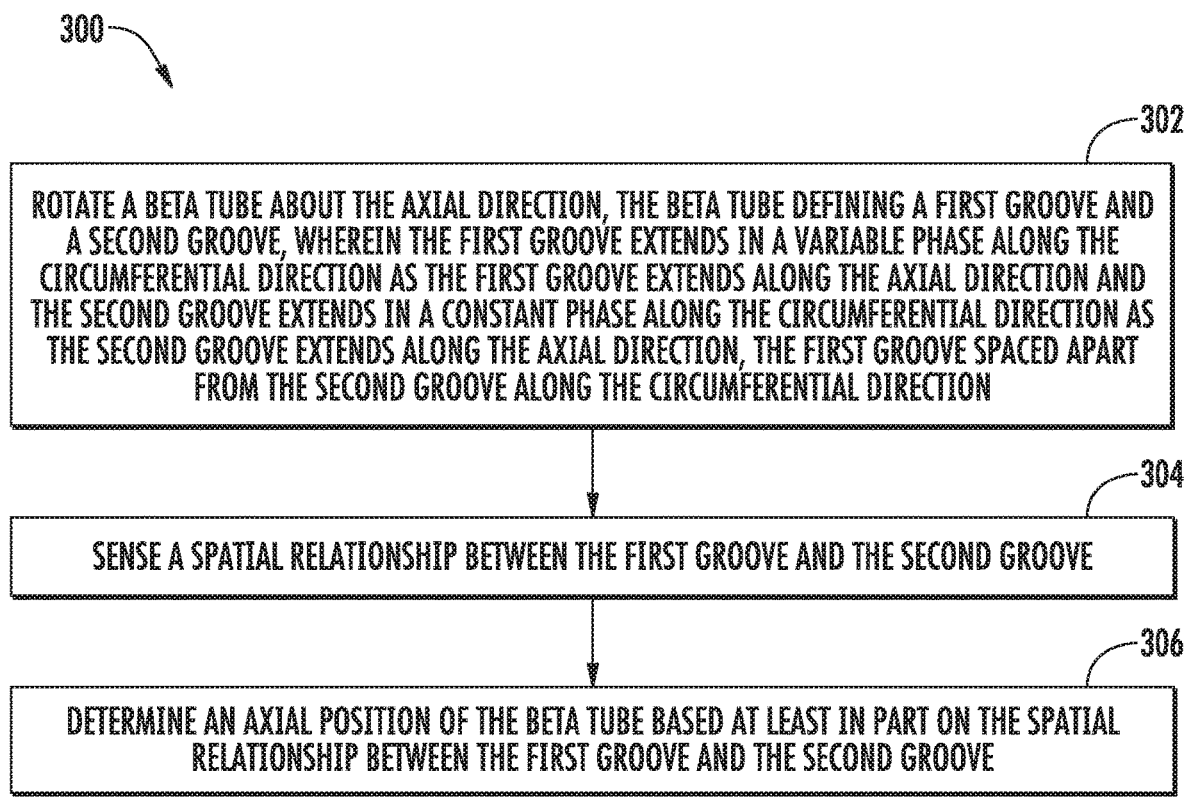
FIG. 7 provides a flow diagram of an exemplary method according to exemplary embodiments of the present disclosure.

FIG. 7 provides a flow diagram of an exemplary method (300) for determining an angular position of the propeller blades 150 of a propeller assembly 106 about their respective pitch axes P according to exemplary embodiments of the present disclosure. Some or all of the method (300) can be implemented by one or more of the components described herein, such as e.g., the engine controller 250, the sensor 190, the beta tube 170, etc. In addition, FIG. 7 depicts method (300) in a particular order for purposes of illustration and discussion. It will be appreciated that exemplary method (300) can be modified, adapted, expanded, rearranged and/or omitted in various ways without deviating from the scope of the present subject matter.

At (302), exemplary method (300) includes rotating the beta tube 170 about the axial direction A, the beta tube 170 defining a first groove 202 and a second groove 204, wherein the first groove 202 extends in a variable phase along the circumferential direction C as the first groove 202 extends along the axial direction A and the second groove 204 extends in a constant phase along the circumferential direction C as the second groove 204 extends along the axial direction A, the first groove 202 spaced apart from the second groove 204 along the circumferential direction C.

At (304), exemplary method (300) includes sensing a spatial relationship between the first groove 202 and the second groove 204. The spatial relationship can be determined by any suitable means, such as e.g., by detecting the spacing between the grooves 202, 204 or by sensing when the first groove 202 reaches a radial proximity to the sensor 190 and when the second groove 204 reaches a radial proximity to the sensor 190. One or more signals indicative of the spatial relationship can be sent to the engine controller 250 for processing such that the spatial relationship can be determined.

At (306), exemplary method (300) includes determining an axial position of the beta tube 170 based at least in part on the spatial relationship between the first groove 202 and the second groove 204. For example, based on the one or more signals indicative of the spatial relationship, the engine controller 250 can determine the spatial relationship by e.g., calculating or determining the time delay between when the first groove 202 reaches radial proximity to the sensor 190 and when the second groove 204 reaches radial proximity to the sensor 190. And based on the spatial relationship, the controller 250 can determine the axial position of the beta tube 170. Once the axial position of the beta tube 170 is known, the engine controller 250 can determine the blade angle of the propellers 150 by using a lookup table that relates the axial position of the beta tube 170 with the blade angle position of the propeller blades 150.

In some exemplary implementations of method (300), the spatial relationship is a circumferential distance between the first groove and the second groove along the axial direction A, and wherein the spatial relationship corresponds to the axial position of the beta tube 170.

In some exemplary implementations, method (300) may further include receiving one or more signals indicative of the spatial relationship between the first groove 202 and the second groove 204 to an engine controller 250 of the engine 100. Thereafter, the method may include determining the blade angle of the propeller blades 150 based at least in part on the one or more signals.

In yet further implementations of method (300), the one or more signals is a time between the first groove reaching radial proximity to the sensor and the second groove reaching radial proximity to the sensor as the beta tube rotates about the axial direction A.

In yet further implementations of method (300), the first groove at least partially defines a helix, and wherein the helix of the first groove varies in phase about one hundred ten degrees (110°) along the circumferential direction.

In yet further implementations of method (300), the engine 100 includes a sensor 190, and wherein the sensor 190 is positioned proximate the first and second grooves 202, 204 such that the sensor 190 can detect the first and second grooves 202, 204 as the beta tube 170 is rotated about the axial direction A, and wherein during determining, the method further includes comparing a time delay between a time when the first groove 202 reaches a radial proximity to the sensor 190 and a time when the second groove 204 reaches a radial proximity to the sensor 190 as the beta tube 170 rotates about the axial direction A such that the spatial relationship between the first and the second groove 202, 204 can be determined.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A blade feedback system for an engine defining an axial direction, a radial direction, and a circumferential direction, the blade feedback system comprising:
    a propeller assembly rotatable about the axial direction and operatively coupled with the engine, the propeller assembly comprising a plurality of blades spaced apart in the circumferential direction and disposed about the axial direction, wherein the blades are configured to be rotated through a plurality of blade angles about their respective pitch axes each extending in the radial direction;
    a housing comprising a sensor, the housing attached to or integral with the engine and in adjacent arrangement with the propeller assembly along the axial direction; and
    a beta tube operatively coupled with the plurality of blades and extending at least partially into the housing and at least partially into the propeller assembly, the beta tube rotatable about the axial direction as the propeller assembly rotates and translatable along the axial direction when the plurality of blades are rotated about their respective pitch axes, and wherein the beta tube defines one or more grooves extending along the axial direction and positioned proximate the sensor of the housing such that the sensor can detect the one or more grooves, and
    wherein the propeller assembly is operatively coupled with the engine by a propeller shaft, and wherein the beta tube extends further aft than the propeller shaft along the axial direction.

2. The blade feedback system of claim 1, wherein the one or more grooves include a first groove and a second groove, wherein the first groove and the second groove are spaced apart from one another along the circumferential direction and wherein the first groove varies in phase along the circumferential direction as the first groove extends along the axial direction.

3. The blade feedback system of claim 1, wherein the one or more grooves include a first groove and a second groove, wherein the first groove extends along the axial direction and along the circumferential direction to at least partially define a helix, and wherein the second groove extends in the axial direction.

4. The blade feedback system of claim 3, wherein the helix of the first groove corresponds to a rotatable range through all of the plurality of blade angles.

5. The blade feedback system of claim 3, wherein the second groove extends in the axial direction in a constant phase.

6. The blade feedback system of claim 3, wherein the helix of the first groove varies in phase between seventy degrees and one hundred eighty degrees along the circumferential direction.

7. The blade feedback system of claim 1, wherein the one or more grooves include a first groove and a second groove, and wherein:
    the first groove extends at least partially in the circumferential direction and along the axial direction to at least partially define a helix portion and a constant phase portion contiguous with the helix portion; and the second groove extends in the axial direction in a constant phase, wherein the constant phase portion of the first groove is parallel with the second groove.

8. The blade feedback system of claim 1, wherein the one or more grooves include a first groove extending along the axial direction, the first groove having a groove width varying along the axial direction, and wherein the sensor is configured to sense the groove width such that the axial position of the beta tube can be determined.

9. The blade feedback system of claim 8, wherein the groove width of the first groove gradually increases along the axial direction.

10. The blade feedback system of claim 1, wherein the engine further comprises:
an engine controller communicatively coupled with the sensor, wherein the engine controller is configured to receive one or more signals from the sensor indicative of at least one of the axial position and rotational speed of the beta tube.

11. The blade feedback system of claim 1, wherein the one or more grooves include a first groove and a second groove, and wherein the sensor is configured to sense a distance between the first and second grooves, and wherein the blade feedback system further comprises:
an engine controller communicatively coupled with the sensor, wherein the engine controller is configured to receive one or more signals from the sensor indicative of the axial position of the beta tube; and wherein the one or more signals are indicative of a time between the first groove reaching radial proximity to the sensor and the second groove reaching radial proximity to the sensor as the beta tube rotates about the axial direction.

12. A method for determining a blade angle of propeller blades of a propeller assembly about their respective pitch axes, the propeller assembly operatively coupled with an engine defining an axial direction, a radial direction, and a circumferential direction, the method comprising:
rotating a beta tube about the axial direction, the beta tube defining a first groove and a second groove, wherein the first groove extends in a variable phase along the circumferential direction as the first groove extends along the axial direction and the second groove extends in a constant phase along the circumferential direction as the second groove extends along the axial direction, the first groove spaced apart from the second groove along the circumferential direction, and wherein the propeller assembly is operatively coupled with the engine by a propeller shaft and the beta tube extends further aft than the propeller shaft along the axial direction;
sensing, by a sensor positioned proximate the first and second grooves such that the sensor can detect the first and second grooves as the beta tube is rotated about the axial direction, a spatial relationship between the first groove and the second groove; and
determining an axial position of the beta tube based at least in part on the spatial relationship between the first groove and the second groove.

13. The method of claim 12, wherein the spatial relationship is a circumferential distance between the first groove and the second groove, and wherein the spatial relationship corresponds to the axial position of the beta tube.

14. The method of claim 12, wherein the method further comprises:
receiving one or more signals indicative of the spatial relationship between the first groove and the second groove; and
determining the blade angle of the propeller blades based at least in part on the one or more signals.

15. The method of claim 12, wherein during determining, the method further comprises:
comparing a time delay between a time when the first groove reaches a radial proximity to the sensor and a time when the second groove reaches a radial proximity to the sensor as the beta tube rotates about the axial direction such that the spatial relationship between the first and the second groove can be determined.

16. A gas turbine engine defining an axial direction, a radial direction, and a circumferential direction, the gas turbine engine comprising:
a core turbine engine;
a propeller assembly rotatable about the axial direction and operatively coupled with the core turbine engine by a propeller shaft, the propeller assembly having a plurality of blades rotatable through a plurality of blade angles about their respective pitch axes;
a housing attached to or integral with the core turbine engine and in adjacent arrangement with the propeller assembly along the axial direction;
a sensor disposed within the housing; and
a beta tube operatively coupled with the plurality of blades, the beta tube extending at least partially into the propeller assembly and at least partially into the housing aft of the propeller shaft, the beta tube rotatable about the axial direction as the propeller assembly rotates about the axial direction and translatable along the axial direction when the plurality of blades are rotated about their respective pitch axes, and wherein the beta tube defines one or more grooves extending along the axial direction and positioned proximate the sensor of the housing such that the sensor can detect the one or more grooves.

17. The gas turbine engine of claim 16, further comprising:
an engine controller communicatively coupled with the sensor, the engine controller configured to receive one or more signals indicative of an axial position of the beta tube such that the blade angle of the plurality of blades can be determined.

18. The gas turbine engine of claim 16, wherein the beta tube includes a body portion and an extension portion attached to or integral with the body portion, the extension portion coaxially aligned with the body portion along the axial direction, and wherein the extension portion has a smaller diameter than the body portion and includes the one or more grooves.

19. The gas turbine engine of claim 16, wherein the one or more grooves include a first groove and a second groove, wherein the first groove extends in a variable phase along the circumferential direction as the first groove extends along the axial direction and the second groove extends in a constant phase along the circumferential direction as the second groove extends along the axial direction, and wherein the first groove is spaced apart from the second groove along the circumferential direction.

20. The gas turbine engine of claim 16, wherein the one or more grooves include a first groove and a second groove, and wherein:
the first groove extends at least partially in the circumferential direction and along the axial direction to at least partially define a helix portion and a constant phase portion contiguous with the helix portion; and the second groove extends in the axial direction in a constant phase, wherein the constant phase portion of the first groove is parallel with the second groove.

* * * * *